Figure 1:
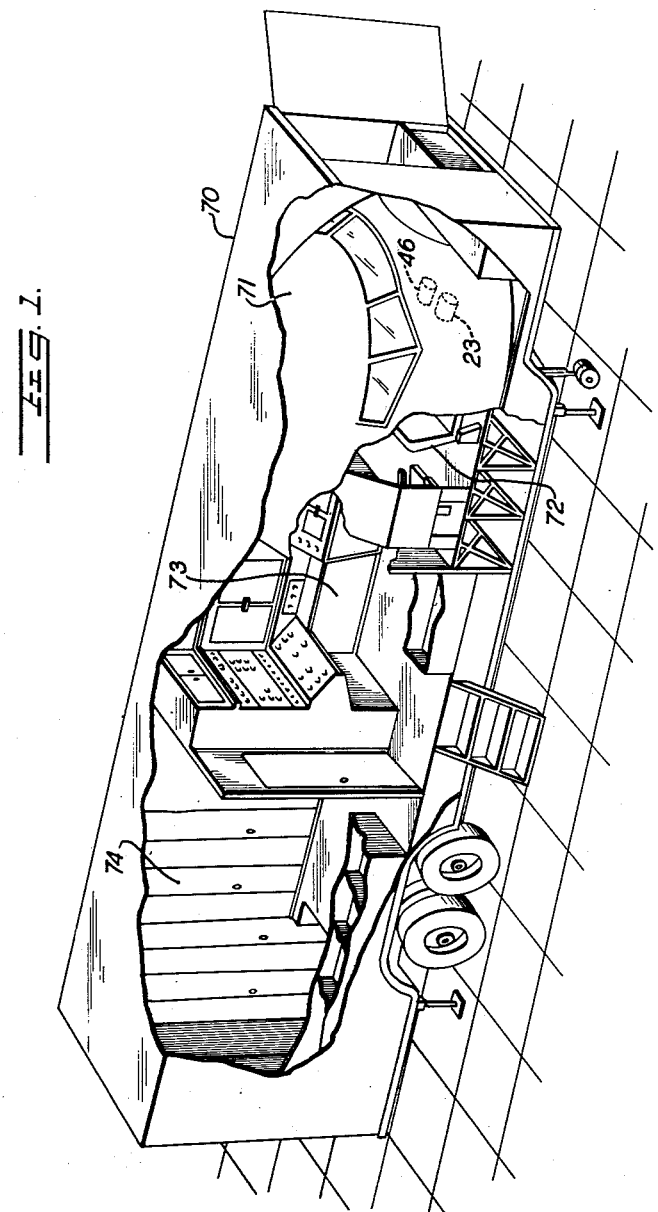

Oct. 10, 1961     H. D. WHITE, JR., ET AL     3,003,251
JET ENGINE FLIGHT TEMPERATURE CHARACTERISTICS SIMULATOR
Filed Feb. 14, 1958     4 Sheets-Sheet 1

INVENTORS.
HOSEA D. WHITE JR.
HENRY J. McGINTY

BY Donald P. Smith
ATTORNEY

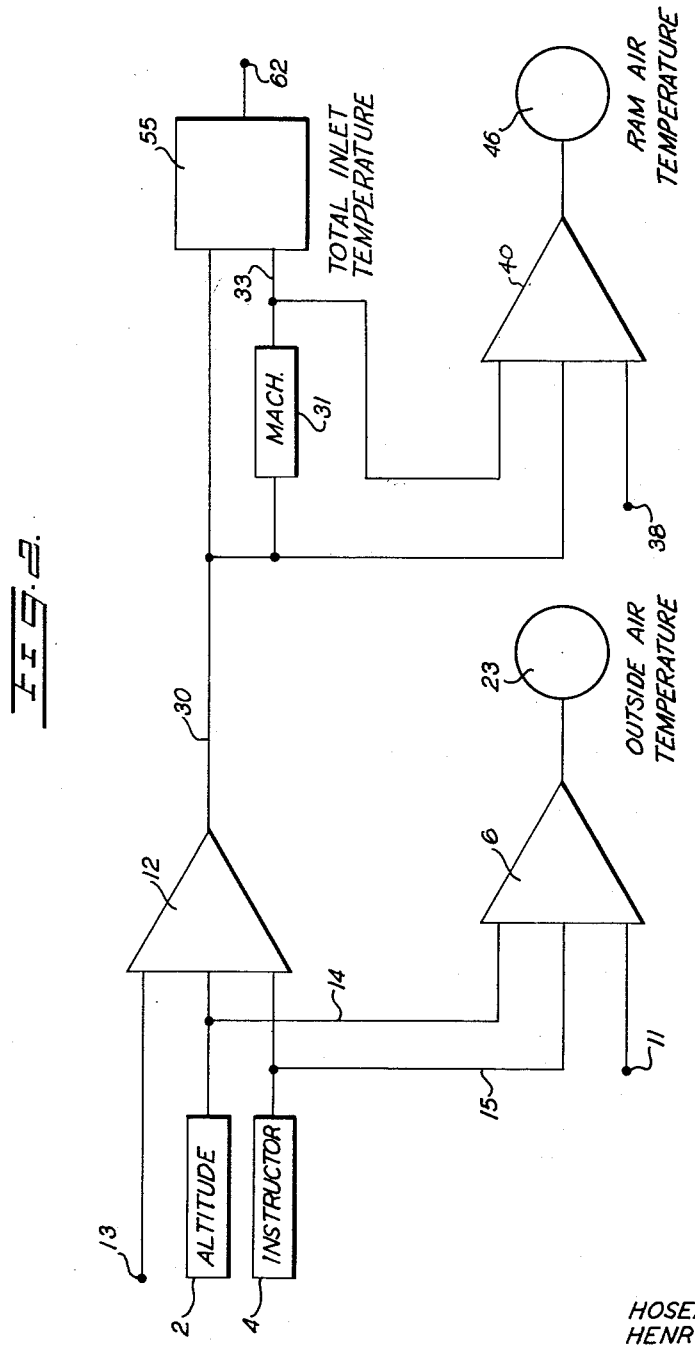

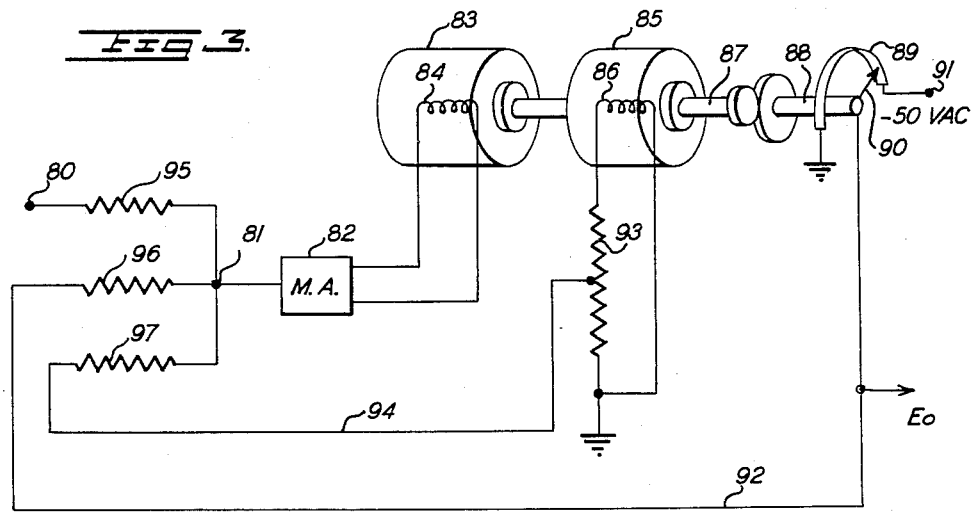
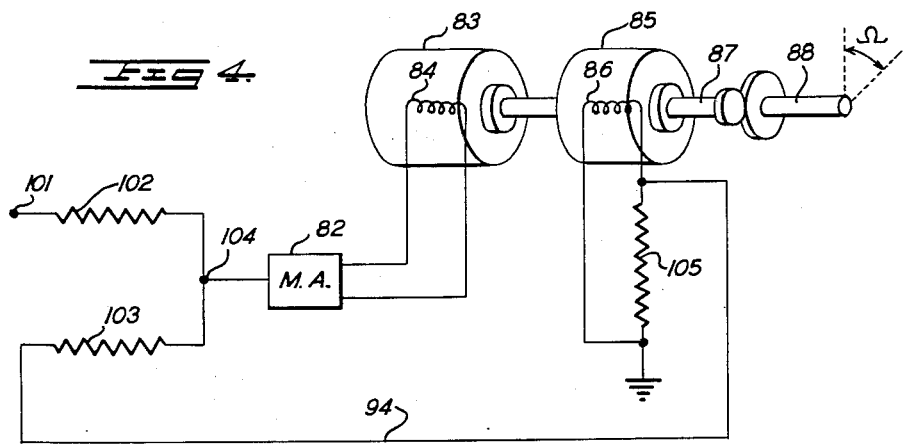

Oct. 10, 1961  H. D. WHITE, JR., ET AL  3,003,251
JET ENGINE FLIGHT TEMPERATURE CHARACTERISTICS SIMULATOR
Filed Feb. 14, 1958  4 Sheets-Sheet 4

INVENTORS
HOSEA D. WHITE JR.
HENRY J. McGINTY
BY Donald P. Smith
ATTORNEY ced Oct. 10, 1961

United States Patent Office 3,003,251
Patented Oct. 10, 1961

3,003,251
JET ENGINE FLIGHT TEMPERATURE CHARACTERISTICS SIMULATOR
Hosea D. White, Jr., Greenbelt, and Henry J. McGinty, Hyattsville, Md., assignors to ACF Industries, Incorporated, New York, N.Y., a corporation of New Jersey
Filed Feb. 14, 1958, Ser. No. 715,338
8 Claims. (Cl. 35—12)

This invention relates generally to flight simulators and more particularly to the simulation of temperature computation and temperature indication in flight simulators. More specifically, the invention reveals the computation and indication of several temperature characteristics encountered in actual operation of jet powered aircraft, i.e., outside air temperature, total inlet temperature and ram air temperature.

In a jet powered aircraft two temperature conditions of interest are indicated to the pilot, ram air temperature and outside air temperature. As is well known a temperature measuring instrument immersed in a high velocity air blast will not indicate the true ambient temperature of the air but will indicate a higher value known in aerodynamics as the ram air temperature. Outside air temperature or ambient temperature is obtained from the ram air temperature by subtracting therefrom in a computer a factor proportional to the temperature rise caused by aircraft velocity. A pair of instruments fixed within the field of vision of the pilot respectively indicate the above-described conditions.

Total inlet temperature is the temperature of the air at the inlet of the jet engine and although it has a bearing on the r.p.m., fuel flow and tail pipe temperature of the aircraft, there is no direct-reading indication in the craft to the pilot as to what the actual total inlet temperature is. A value known as recovery factor is utilized in converting the measured ram air temperature to outside air temperature. This recovery factor is a measure of temperature rise due to velocity effects as dependent upon the physical characteristics of the aircraft. If there were no cowling or structure around the aircraft engine the temperature rise at the engine due to velocity would be maximum. Under such conditions the recovery factor would be unity. Due to the structure surrounding the engine the temperature increase is normally less than maximum, that is, a value less than unity. The simulated recovery factor must be as closely identical with the actual recovery factor of the aircraft as possible. It is to the simulation of these three basic temperatures that this invention is directed.

Prior art flight simulators have utilized voltage functions of simulated altitude and a flight instructor's modifying control to provide analog voltages to be added together to produce a voltage representing outside air temperature. The voltage is used as the driving signal to position a servomechanism which, in turn, mechanically operates a simulated flight instrument calibrated to read the calculated simulated value of outside air temperature. This operation falls far short of the required temperature simulation desired for flight simulation of modern jet aircraft in that only the one temperature is simulated by computation and indication and other important temperature considerations of jet flight, for example the value and effect of ram air temperature and total inlet temperature, are ignored.

This invention represents an important advance over prior art flight simulator temperature apparatus in that the pertinent flight temperature characteristics and indications are realistically simulated, and the computation and indication of outside air temperature, ram air temperature and total inlet temperature are accomplished by altitude, velocity and instructor analog voltage controls operating in combination with temperature constant voltages, summing devices and indicating devices.

It is accordingly a broad object of this invention to simulate the computation of three temperature values and provide an instrument indication of two of the three temperature values.

It is a further object of this invention to provide a system for computing the temperature values required in the simulation of jet aircraft flight.

It is a further object of this invention to provide a simplified method of converting one temperature indication to another indication by the addition or substraction of constants or constant quantities.

It is a still further object of this invention to provide apparatus for simulating simultaneously the effects of total inlet temperature, ram air temperature and outside air temperature or any combination thereof.

Figure 5:
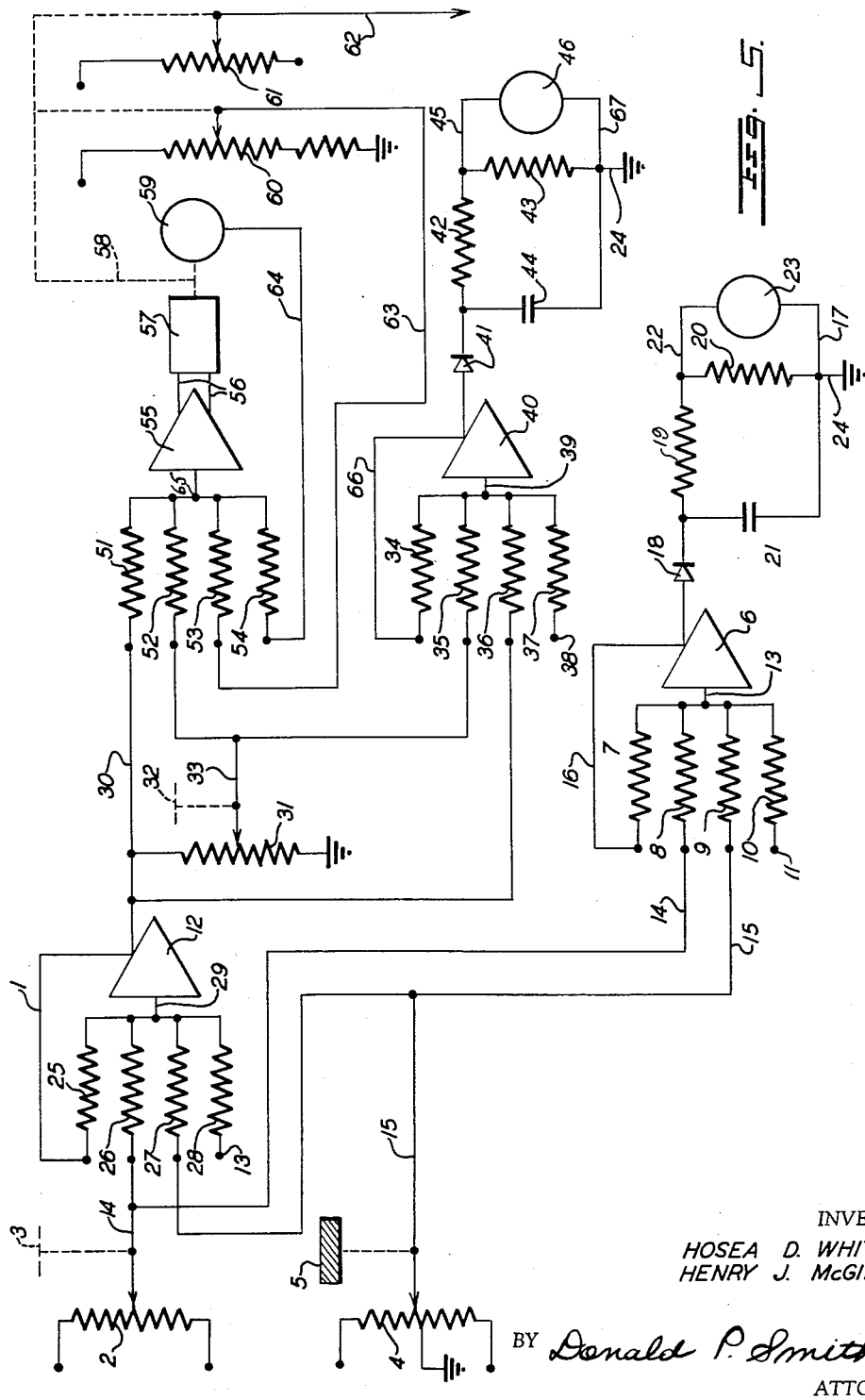

Referring now to the drawings, wherein:
FIG. 1 is a perspective view showing a typical mobile flight simulator installation.
FIG. 2 is a block diagram of the simulated flight temperature computer.
FIG. 3 is a schematic representation of a typical position servo mechanism as used herein.
FIG. 4 is a schematic representation of a typical velocity servo mechanism as used herein.
FIG. 5 is a schematic circuit diagram of the simulated flight temperature computer.

Summarily stated, this invention comprises, in a flight simulator, a device for computing the values of simulated outside air temperature, ram air temperature and total inlet temperature, in which device altitude, velocity and instructor temperature controls operate in combination with constant voltages, summing amplifiers and indicating devices to represent the several temperature values during simulated flight.

In the operation of modern jet aircraft, temperature values are of great importance in determining pilot procedures for safe and efficient flight. The pilot must be aware at all times of the air temperature at various points of the aircraft to intelligently exercise control under both normal and emergency procedures. The ambient or outside temperature and the ram air temperature are measured and indicated to the pilot.

Referring now to FIG. 1 wherein is shown in perspective view a mobile flight trainer 70 in which all aspects of flight are synthetically reproduced. Within the trailer there shown, is located the simulated aircraft cockpit 71 housing the pilot's seat 72, an instructor's station 73 and the computer racks 74. When stationed in the pilot's seat 72 during a training cycle a student will observe the indications appearing on the outside air temperature indicator 23 and the ram air temperature indicator 46 shown in dotted outline for purposes of illustrating their structural positions.

Referring now to FIG. 2 which shows a simplified block diagram of the invention, a summing amplifier 12 has inputs consisting of a constant voltage source 13 representing the conversion from degrees centigrade to degrees Kelvin, a source 2 of derived voltage proportional to the outside air temperature for a standard day as a function of altitude, and a voltage proportional to variation of outside air temperature from a standard day and under the control of instructor's control 4. The source of voltage proportional to the outside air temperature for a standard day may be derived in any known way. The composite output of amplifier 12 is one of the inputs to amplifier 55 which also has an input 33 from a prior art source 31 of derived voltage proportional to $Mach^2$, The output of amplifier 55 is used to derive a voltage proportional to total inlet temperature.

A summing amplifier 6 has inputs comprising the altitude voltage on conductor 14, the outside air temperature variation from a standard day voltage on conductor 15 and a constant voltage source 11 the amplitude of which is selected to determine the calibration of meter 23. The output voltage of amplifier 6 represents outside air temperature and when applied to meter 23 indicates the simulated outside air temperature in degrees centigrade. Summing amplifier 40 has inputs comprising the output voltage of amplifier 12, the Mach$^2$ times the output of amplifier 12 potential from conductor 33 and a fixed voltage source 38 representing a constant value proportional to the conversion from degrees Kelvin to degrees centigrade. The output of amplifier 40 is proportional to the simulated ram air temperature plus a constant for meter calibration and activates meter 46 to read such value.

FIGS. 3 and 4 show types of position and velocity servos which may be used to derive the voltages representative of quantities such as is done by the altitude shaft 3 and the Mach shaft 32 shown at FIG. 5. The total inlet temperature computer 58 (FIG. 5) is an example of the use of a position type servo as shown in FIG. 3 where the final driven shaft is designated by reference character 88.

Referring to FIG. 3 which is functional schematic diagram of a typical electro-mechanical position servo it will be seeen that the voltage on conductor 92 will be representative of the angular position of shaft 88. The purpose of this device is to convert the input voltage 80 into a mechanical shaft position with sufficient torque to drive potentiometers or other devices as needed. The motor amplifier 82 is a high gain amplifier which develops the power required to drive the motor and its mechanical load. The potentiometer 89 may be of any construction convenient to have a contact arm driven along its length by the mechanical structure 83. One such potentiometer construction is that shown in Patent No. 2,543,228, issued February 27, 1951, to L. M. Burgess, for "Variable Resistor Construction." Assuming first that the shaft 88 is set at zero degrees rotation, the potentiometer arm 90 will be at the ground connection of potentiometer 89. Under such conditions there will be no voltage present on the electrical connector 92. Assume further that there is no input voltage at terminal 80. Neglecting voltage on connector 94 for the moment, summation point 81 will have a potential of zero volts and since connection 81 is the driving point of the motor amplifier 82, zero power will be fed to the motor and the shaft 83 will remain at rest. If the input voltage 80 becomes a positive phase say 25 volts A.C. the voltage at 81 will tend to follow 80, power will be developed in the output of the motor amplifier and the motor 83 will start to turn. As the motor 83 turns, wiper 90 of the potentiometer 89 will be turned up from ground, picking off a negative phase A.C. voltage of increasing magnitude, since the voltage on connector 92 which is fed back from the potentiometer 89 is 180° out of phase with the input voltage at terminal 80. The summation of the two out of phase voltages through input impedances 95 and 96 will cancel each other out with a resultant voltage of zero at point 81. By limiting the value of the input voltages at point 80 to the voltage applied at point 91 the servo mechanism will be limited to the rotation equivalent to the number of angular degrees in potentiometer 89 provided 95 and 96 are equal resistors. If the input voltage at terminal 80 now decreases the voltage at 81 will tend to drop and the motor will turn in the opposite direction and the wiper will be driven down and again seek to restore equilibrium. The angle of shaft 88 follows the input voltage, and the shaft position is proportional to the input signal. It is evident that voltage at 80 and 91 must always be 180° out of phase if the condition of equilibrium at point 81 is to be met.

The generator 85 induces a generated voltage in winding 86 which has impedance 93 as a load. The generator voltage on conductor 94 is proportional to the rate at which the generator is turning and is zero for the stationary condition. The purpose of the generator voltage is to damp the system and prevent hunting about the balanced point for any particular value of input voltage at terminal 80. The phase of the voltage on conductor 94 is always such as to oppose the motion of the shaft. The impedance 93 is tapped as to act as a voltage divider and phase correcting load on the generator. The values of resistor 95 and 96 are determined by the scaling of the system. The voltage fed back on conductor 92 is analogous to the computed value resulting from the input voltages. The output terminal $E_0$ may be utilized for transferring the voltage analog to other places in the flight computer in dependence on the simulation equations.

FIG. 4 is a functional schematic diagram of a typical integrator type electro-mechanical velocity servo. In contradistinction to the apparatus shown in FIG. 3 which servos itself to a position in accordance with the voltage applied at terminal 80, the apparatus of FIG. 4 rotates at a speed or velocity proportional to the input at terminal 101. By definition this type of integrator produces a shaft rotation whose rate is proportional to voltage input. It is convenient to use several elements of a servo to produce this result. The integration is accomplished by driving the shaft 88 at an angular velocity proportional to the input voltage 101. The structure of FIG. 4 is in all particulars the same as FIG. 3 without an answering potentiometer. Therefore the shaft 88 will rotate continuously since there is no voltage fed back to restore the equilibrium condition of zero voltage input. In the particular application the rate of shaft rotation for a certain value of voltage at 101 is determined by resistors 102 and 103 and the gear ratio between the motor generator and the shaft 88 where the angle measured is to be shown. If the phase of voltage applied to terminal 101 is fixed, the direction of shaft rotation is determined by the motor connections. Resistor 105 is used as a phase correcting load on the generator.

Referring now to FIGS. 2 and 5, the outside air temperature is calculated first and may be considered to be the basic quantity. This value is determined by summing the A.C. voltage proportional to temperature resulting from the simulated altitude of the aircraft from potentiometer 2 (standard day temperatures) with the A.C. voltage from the instructor's outside air temperature potentiometer 4 (variations from standard). In practice the information designed into potentiometer 2 is in accordance with the findings of the National Advisory Committee for Aeronautics and is generally accepted as the standard for correct temperature information. The summation of the analog voltages representing temperature due to altitude plus the voltage due to the instructor's outside air temperature control form the entire voltage analogous to outside air temperature. Expressed by formula:

$$Toa = f(hp) + Aoa$$

where $f(hp)$ represents standard NACA outside air temperature for a standard day as a function of altitude in degrees centigrade and is provided by potentiometer 2 on altitude shaft 3. $Aoa$ is the instructor's outside air temperature variation in degrees centigrade and is provided by potentiometer 4 located at the instructor's control panel and operated directly by the knob 5. The two quantities $f(hp)$ and $Aoa$ are combined by feedback type summing amplifier 6 with a constant voltage from terminal 11 which may be selected in accordance with the meter movement of indicator 23 to provide the correct range of operation for the indicator. The output of summing amplifier 6 is therefore a voltage representative of outside air temperature ($Toa$) in degrees centigrade plus a constant for meter calibration. This voltage is then converted to a pilot's indication by means of rectifier 18 and the filter comprising elements 19, 20 and 21. This filter circuit is standard and converts the A.C. to a D.C. current which drives the milliammeter 23 to indicate to the student pilot the temperature in degrees.

The previously mentioned values of altitude temperature plus the arbitrary instructor's outside air temperature control are applied through impedances 26 and 27 together with a constant voltage representing 273° appearing on conductor 13 and applied through impedance 28 to common point 29. The feedback type amplifier 12 adds the three quantities and yields an output voltage on conductor 30 which represents outside air temperature in degrees centigrade plus the quantity 273°. This value is fed back over line 1 through impedance 25 to close the loop of amplifier 12 in the well known way. The output of amplifier 12 is fed directly to input impedance 51 of motor amplifier 55 and directly to input impedance 36 of amplifier 40. The output on conductor 30 is also fed to potentiometer 31 which is calibrated to yield voltages representing Mach². The Mach² potentiometer 31 is physically mounted on an electro-mechanical shaft in the trainer whose position is analogous to the quantity Mach as calculated from the computers in the flight simulators and responsive to the manipulations of the flight controls. The arm of potentiometer 31 is mechanically moved according to the position of such electro-mechanical shaft and a voltage is picked off and applied to conductor 33 which represents the product of the output of amplifier 12 multiplied by Mach². This quantity, which may be indicated as outside air temperature plus 273° times Mach² times a constant representing the recovery factor, is fed into input impedance 52 of motor amplifier 55 and input impedance 35 of summing amplifier 40 for the computation of the values of total inlet temperature and ram air temperature. As will later be more fully pointed out the quantities total inlet temperature and ram air temperature differ only in the value of the recovery factor (K). By the proper selection of the values of input impedances 52 and 35 the factor may be appropriately introduced into the respective summing amplifiers 55 and 40.

As has been stated previously the ram air temperature is a combination or an addition of the outside air temperature plus the ram air effects. Ram air temperature is defined as:

$$T_{ra} = T_{oa} + .2K(T_{oa}+273)\text{ Mach}^2$$
($T_{ra}$ in degrees centigrade)

where $T_{oa}$ is defined above as:

$$T_{oa} = f(hp) + A_{oa}$$

and $.2K(T_{oa}+273)$ Mach² represents the effects of ram air temperature rise in the outside air temperature indication. K is the recovery factor. $T_{ra}$ is measured in degrees centigrade. This is accomplished by feeding the value of outside air temperature+273° from the output of amplifier 12 to input impedance 36 of amplifier 40. Also the quantity outside air temperature plus 273° times Mach squared times 0.2K is fed through conductor 33 to input impedance 35 of amplifier 40. An additional value of voltage is applied to conductor 38 which when added through input impedance 37 calibrates meter 46 in degrees centigrade. The output voltage is a summation of those voltages which make up the quantity ram air temperature. Since this voltage is an A.C. voltage at this point it is rectified by rectifier 41 and filtered by the filter comprising impedances 42, 43 and capacitor 44 to provide a D.C. voltage appearing at conductor 45 which is fed to the milliammeter 46. This meter is returned to ground terminal 24 by means of conductor 67. It is therefore seen that the milliammeter will register an indication of ram air temperature as a summation of outside air temperature, ram effects through the velocity indicative Mach² and a constant value to provide correct scaling for the meter movement.

The computation for total inlet temperature is accomplished by means of a position servo of the type shown in FIG. 3. The input to this servo is similar with the inputs to the ram air temperature indicator amplifier 40, the physical differences being in the input impedance scalings of amplifiers 40 and 55 and the additional constant input to amplifier 40. The total inlet temperature $T_i$ is defined as:

$$T_i = (T_{oa}+273)(1+0.2\text{ Mach}^2)$$

where $T_{oa}$ is equal to: $f(hp)+A_{oa}$;

$(T_{oa}+273)$ represents outside air temperature in degrees Kelvin, and $(1+0.2\text{ Mach}^2)$ represents the standard NACA compressibility effects on temperature for 100% recovery function of Mach number.

Mach itself is equal to true velocity divided by the speed of sound at the particular altitude simulated and is therefore an indication of velocity. The actual difference between the inlet total temperature and the outside air temperature is caused by the same physical airflow phenomena as the difference between the ram air temperature and the outside air temperature. These changes are caused by the compressibility effects of Mach number on temperature, as modified by recovery factor.

This becomes clear when the equation for $T_{Ra}$ is rewritten as follows:

$$T_{Ra} = (T_{oa}+273)(1+.2KM a^2) - 273$$

(where the $-273$ converts $T_{Ra}$ to degrees centigrade) and compared with the expression for $T_i$:

$$T_i = (T_{oa}+273)(1+.2Ma^2)$$

Thus the two temperatures in degrees Kelvin differ only by the recovery factor K. In the case of indicated ram air temperature for one particular aircraft, K equals 0.8 and for total inlet temperature, K equals 1.

The outside air temperature quantity in degrees Kelvin is fed through conductor 30 to input impedance 51 of motor amplifier 55. The ram air effects on temperature are fed through conductor 33 to input impedance 52. The summation of all of the input voltages for motor amplifier 55 occurs at the grid of the first stage of the motor amplifier. The output of motor amplifier 55 is fed by conductors 56 to motor 57. The resulting motor shaft position drives an A.C. generator 59 which impresses a voltage on connector 64 to the input impedance 54 and thence is added by motor amplifier 55. The motor shaft output also drives the arms of potentiometers 60 and 61 which both have A.C. voltages connected to the terminals thereof. The arm of potentiometer 60 has impressed upon it a voltage proportional to the mechanical position of the shaft 58 and this voltage is connected by conductor 63 to the input impedance 53 and acts as an answer voltage to answer the summation of the two controlling voltages applied to input impedances 51 and 52. Potentiometer 61 positions at a voltage proportional to total inlet temperature shaft position and is therefore analogous to the total inlet temperature value. The voltage appearing at the arm of potentiometer 61 may then be fed to other portions of the flight simulator which are responsible for the computation of values of fuel flow, r.p.m. and tail pipe temperature.

It is thus seen that this invention computes the values of outside air temperature, ram air temperature and total inlet temperature and indicates to a student the values of ram air temperature and outside air temperature during realistic simulated flight.

It should be understood that this invention is not limited to specific details of construction and arrangement thereof herein illustrated, and that changes and modifications may occur to one skilled in the art without departing from the spirit of the invention.

What is claimed is:

1. In an apparatus for simulating high velocity jet powered flight, of the type having a computer for deriving a voltage proportional to simulated flight altitude and representing standard temperature and a computer for deriving a voltage proportional to a function of simulated flight Mach, a system for computing and indicating simulated flight temperature characteristics comprising a member under the control of an instructor for deriving a voltage proportional to variations from standard in simulated air temperature, an electrical circuit including first and second voltage combining means, said first combining means being connected to said member and said altitude computer for producing a voltage proportional to outside air temperature, means connected to said first combining means to indicate outside air temperature, said second combining means being connected to said member and said altitude computer, means connected to the said second combining means for combining the composite output thereof with the derived Mach function voltage to derive a voltage proportional to ram air temperature, means connected to said last recited means to indicate ram air temperature, second means connected to the said second combining means for combining the composite output thereof with the derived Mach function voltage, and a servo system connected to the last above recited means to derive a voltage proportional to the total inlet temperature.

2. The invention as set forth in claim 1 wherein the said first and second recited means connected to said second combining means include respective input impedances scaled in accordance with the recovery factors of the vehicle.

3. In an apparatus for simulating high velocity jet powered flight, of the type having a computer for deriving a voltage proportional to simulated flight altitude and representing standard temperatures and a computer for deriving a voltage proportional to a function of simulated Mach number, a system for computing and indicating simulated flight temperature characteristics comprising in combination a circuit having a parameter under the control of an instructor for deriving a voltage proportional to variations from standard in simulated air temperature, a circuit connected to the altitude computer and the instructor controlled circuit and including a first and a second voltage summing circuit, the said first voltage summing circuit deriving a voltage proportional to outside air temperature, means connected to the output of said first voltage summing circuit to indicate to a student the value of outside air temperature during simulated flight, a third and a fourth voltage summing circuit each connected to the output of said second voltage summing circuit and to the Mach computer, an input impedance scaled in accordance with an aircraft recovery factor connected in each respective circuit between the said third and fourth voltage summing circuits and the Mach computer, whereby the said third summing circuit derives a voltage proportional to the ram air temperature, a device connected to the said third summing circuit to indicate to a student the value of ram air temperature in accordance with an aircraft recovery factor, a servo system connected to the said fourth summing circuit to derive a voltage proportional to total inlet temperature in accordance with another aircraft recovery factor.

4. In an apparatus for simulating high velocity jet powered flight, of the type having a first computer for deriving a voltage proportional to simulated altitude and a second computer for deriving a voltage proportional to a function of simulated Mach the combination comprising means connected to the first computer for deriving a voltage proportional to simulated outside air temperature, means connected to said first and second computers for deriving a voltage proportional to simulated total inlet temperature, means connected to said first and second computers for deriving a voltage proportional to simulated ram air temperature and indicating means connected to said outside temperature means and said ram air temperature means to respectively represent to a trainee the values of outside air temperature and ram air temperature during simulated flight.

5. In an apparatus for simulating high velocity jet powered flight of the type having an altitude computer for deriving a voltage proportional to standard temperatures and a computer for deriving a voltage proportional to a function of simulated Mach number, the combination comprising a control circuit under the regulation of an instructor to derive a voltage proportional to variations in temperature, a combining circuit connected to the control circuit and the altitude computer to derive a voltage representing outside air temperature, a second combining circuit connected to said control circuit, said altitude computer and said Mach number computer to derive a voltage representing ram air temperature.

6. The invention as set forth under claim 5 including a device connected to each respective combining circuit to indicate to a student the value of outside air temperature and ram air temperature.

7. The invention as set forth in claim 6 including a third combining circuit to derive a voltage proportional to total inlet temperature, said third combining circuit comprising an amplifier having the input thereof connected to the altitude computer, the Mach voltage computer and the control circuit, and a servo system connected to the output of said amplifier to derive a voltage proportional to the total inlet temperature.

8. For use in a grounded jet powered aircraft simulator, a circuit to compute ram air temperature comprising a feedback type amplifier having a pair of input impedances connected respectively to a source of derived voltage proportional to outside air temperature, and a source of voltage proportional to the product of a derived voltage proportional to a function of Mach number with a derived voltage proportional to outside air temperature, the respective impedance connected to the said voltage product being scaled in accordance with the recovery factor of the craft, the circuit including a device connected to the output of the said amplifier to indicate to a trainee the ram air temperature during simulated flight.

References Cited in the file of this patent

UNITED STATES PATENTS

| | | |
|---|---|---|
| 2,798,308 | Stern et al. | July 9, 1957 |
| 2,882,615 | Dawson | Apr. 21, 1959 |